US008534047B2

(12) United States Patent
Keefover et al.

(10) Patent No.: US 8,534,047 B2
(45) Date of Patent: Sep. 17, 2013

(54) COMBUSTION ENGINE BREATHING SYSTEMS, COMPONENTS THEREOF AND METHODS OF OPERATING AND CONTROLLING THE SAME

(75) Inventors: Robert D. Keefover, Lake Orion, MI (US); Murray F. Busato, Clinton Township, MI (US); Matt Delavan, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 644 days.

(21) Appl. No.: 12/599,839

(22) PCT Filed: May 21, 2007

(86) PCT No.: PCT/US2007/069355
§ 371 (c)(1),
(2), (4) Date: Aug. 16, 2010

(87) PCT Pub. No.: WO2008/143670
PCT Pub. Date: Nov. 27, 2008

(65) Prior Publication Data
US 2010/0293922 A1 Nov. 25, 2010

(51) Int. Cl.
*F02M 25/06* (2006.01)
*F02B 33/44* (2006.01)
*F02B 47/08* (2006.01)
*F02M 25/07* (2006.01)

(52) U.S. Cl.
USPC ... 60/278; 60/605.2; 123/568.11; 123/568.12

(58) Field of Classification Search
USPC .......... 60/274, 276, 278, 605.2; 123/568.11, 123/568.12
See application file for complete search history.

(56) References Cited

U.S. PATENT DOCUMENTS

| 5,425,239 | A | * | 6/1995 | Gobert | 60/605.2 |
| 5,617,726 | A | * | 4/1997 | Sheridan et al. | 60/605.2 |
| 2002/0112469 | A1 | * | 8/2002 | Kanazawa et al. | 60/285 |
| 2006/0137346 | A1 | * | 6/2006 | Stewart et al. | 60/605.2 |
| 2007/0255484 | A1 | * | 11/2007 | Imai et al. | 701/102 |
| 2008/0156302 | A1 | * | 7/2008 | El Tahry et al. | 123/568.11 |

FOREIGN PATENT DOCUMENTS

| FR | 2847005 | | 5/2004 |
| FR | 2853011 | | 10/2004 |
| JP | 11257167 | A * | 9/1999 |
| JP | 11 280565 | | 10/1999 |
| WO | WO 96/30635 | | 10/1996 |
| WO | WO 2006030933 | A1 * | 3/2006 |

OTHER PUBLICATIONS

PCT/US2007/069355 Written Opinion.
PCT/US2007/069355 Search Report.

* cited by examiner

*Primary Examiner* — Kenneth Bomberg
*Assistant Examiner* — Audrey K Bradley
(74) *Attorney, Agent, or Firm* — BrooksGroup

(57) ABSTRACT

A method including obtaining information representative of the amount of oxides of nitrogen and the amount of particulate matter being produced by a combustion engine, and adjusting the amount of oxides of nitrogen and the amount of particulate matter being produced by the combustion engine by controlling the amount of combustion engine exhaust gas re-circulating through an EGR cooler and through an EGR cooler bypass line using the information.

22 Claims, 7 Drawing Sheets

COMBUSTION ENGINE BREATHING SYSTEMS, COMPONENTS THEREOF AND METHODS OF OPERATING AND CONTROLLING THE SAME

TECHNICAL FIELD

The field to which the disclosure generally relates includes combustion engine breathing systems, components thereof and methods of operating and controlling the same.

BACKGROUND

Control of vehicle exhaust emissions is a mandatory requirement in most countries. Oxides of nitrogen ($NO_X$) and particulate matter are two components of the engine exhaust emissions that must be controlled.

SUMMARY OF EXEMPLARY EMBODIMENTS OF THE INVENTION

One embodiment of the invention includes a method comprising obtaining information representative of the amount of $NO_X$ and the amount of particulate matter being produced by a combustion engine; and adjusting the amount of $NO_X$ and the amount of particulate matter being produced by the combustion engine comprising controlling the amount of combustion engine exhaust gas circulated through an EGR cooler and through an EGR cooler bypass line using the information.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

An embodiment of the invention may include one or more of the following systems, components or methods of operating or controlling the same.

Figure 1:
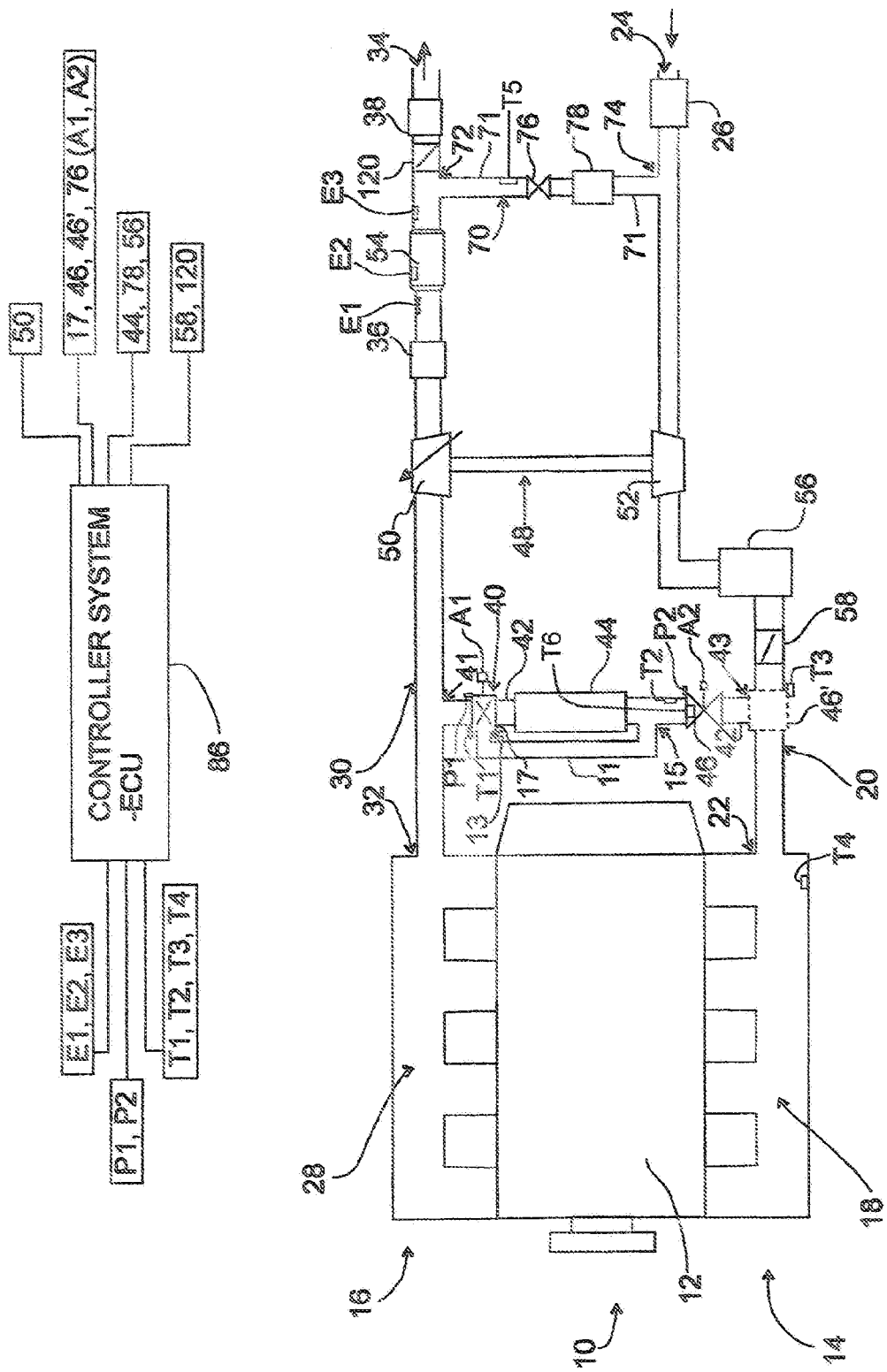
FIG. 1 illustrates one embodiment of the invention.

FIG. 1 is a schematic illustration of one embodiment of the invention including a product or system 10 including a combustion engine breathing system. The system 10 may include a combustion engine 12 constructed and arranged to combust a fuel, such as, but not limited to gasoline, diesel fuel, biodiesel fuel or any other fuel combustible in the presence of an oxidant, such as air. The system 10 may further include an air intake side 14 which may include an air intake manifold 18 connected to the combustion engine 12 to feed air into the cylinders of the combustion engine 12. A primary air intake conduit 20 may be provided and connected at one end 22 to the air intake manifold 18 (or made apart thereof), and may include an open end 24 for drawing air therethrough. An air filter 26 may be located at or near the open end 24 of the air intake conduit 20.

The system 10 may include a combustion exhaust gas side 16 which may include an exhaust manifold 28 connected to the combustion engine 12 to exhaust combustion gases therefrom. The exhaust side 16 may further include a primary exhaust conduit 30 having a first end 32 connected to the exhaust manifold 28 (or made apart thereof) and having an open end 34 for discharging exhaust gas to the atmosphere.

Such a system 10 may further include a first exhaust gas re-circulation (EGR) assembly 40 extending from the combustion exhaust gas side 16 to the air intake side 14. A first EGR valve 46 may be provided in fluid communication with the primary exhaust gas conduit 30 and may be constructed and arranged to control the flow of exhaust gas from the exhaust side 16 to the air intake side and into the combustion engine 12 in a high pressure EGR loop. The first EGR assembly 40 may further include a primary EGR line 42 having a first end 41 connected to the primary exhaust gas conduit 30 and a second end 43 connected to the air intake conduit 20. A cooler 44 may be provided in fluid communication with the primary EGR line 42 for cooling the exhaust gas flowing therethrough. Optionally, the system 10 may further include a turbocharger 48 having a turbine 50 in fluid communication with the primary exhaust gas conduit 30 and having a compressor 52 operatively connected to be driven by the turbine 50 and in fluid communication with the primary air intake conduit 20 to compress gas flowing therethrough. An air charged cooler 56 may be provided in the primary air intake conduit 20 downstream of the compressor 52. A throttle valve 58 may be provided in the primary air intake conduit 20 downstream of the compressor 52 and upstream of the union of a primary EGR line 42 and the air intake conduit 20.

A number of emission control components may be provided in the primary exhaust conduit 30 typically downstream of the turbine 50, if present, or downstream of the first EGR assembly 40. For example, a particulate filter 54 may be provided downstream of the turbine 50. Other emission control components such as a catalytic converter 36 typically provided upstream of the particulate filter 54. A muffler 38 may also be provided downstream of the turbine 50. Additional exhaust gas treatment devices such as lean $NO_X$ traps may also be provided.

Optionally, a second EGR assembly 70 may be provided for low-pressure exhaust gas re-circulation. If desired, the second EGR assembly 70 may be identically constructed as the first EGR assembly 40 (which will be described in greater detail hereafter). The second EGR assembly 70 may include a second EGR line 71 having a first end 72 connected to the primary exhaust gas conduit 30 and a second end 74 connected to the primary air intake conduit 20. A second EGR valve 76 may be provided in fluid communication with the primary EGR conduit 30 or may be provided in the second EGR line 70. A second cooler 78 may be provided in fluid communication with the second EGR line 71 to cool exhaust gas flowing therethrough. A primary exhaust gas conduit 30 may also include a throttle valve 120 to control the amount of exhaust gas being exhausted through the open end 34 and to force exhaust gas to flow through the second EGR line 71.

In one embodiment of the invention, the first EGR assembly 40 may include a bypass line 11 constructed and arranged to allow exhaust gas to bypass the cooler 44. The bypass line 11 may have a first end 13 connected to the EGR line 42 at a position upstream of the cooler 44 and a second end 15 connected to the primary EGR line 42 at a position downstream of the cooler 44 and upstream of EGR valve 46, 46'. A first control valve 17 may be provided to control the amount of exhaust gas flowing through the bypass line 11 and around the cooler 44. In one embodiment, the first control valve 17 may be a three-way valve positioned at the juncture of the bypass line 11 and the primary EGR line 42 at the position upstream of the cooler 44. The first control valve 17 may be moved by an actuator A1. If desired, a position sensor P1 may be provided and operatively connected to the controller system 86 to provide feedback information regarding the actual position of the valve 17 and the controller system 86 may send a signal to the actuator A1 to further adjust the position of the valve in response thereto.

The system shown in FIG. 1 (as well as FIGS. 2-7) may be utilized to balance the amount of NOX and particulate matter being produced by the combustion of fuel in the engine 12. The amount of NOX, particulate matter and other emission constituents may be measured by a variety of sensors such as a NOX or oxygen sensor E1 positioned downstream of the catalytic converter 36, a sensor E2 in the particulate filter 54 to directly or indirectly measure the amount of particulate in the filter over time, or a NOX, particulate matter, or oxygen sensor E3 positioned downstream of the particulate filter 54. Alternatively, the amount of NOX and particulate matter may be indirectly estimated from a variety of operating conditions and parameters using devices such as temperature sensors T1, T2, T3 T4 and/or T5 which may be positioned at a variety of locations in the primary EGR assembly 40, the air intake line 20, air intake manifold 18, exhaust manifold 28, primary exhaust conduit 30 or second EGR. assembly 70. In various embodiments, the temperature sensors may be positioned in conduits or in one of the valves 17, 46, 46', 76.

As will be appreciated, in an alternative embodiment, a three-way EGR valve 46' may be provided at the juncture of the primary EGR line 42 and the air intake line 20. A temperature sensor T3 may be provided in the three-way valve 46'. If desired, the second EGR assembly 70 may also include a bypass line 11 and a first control valve 17 (not shown).

Figure 2:
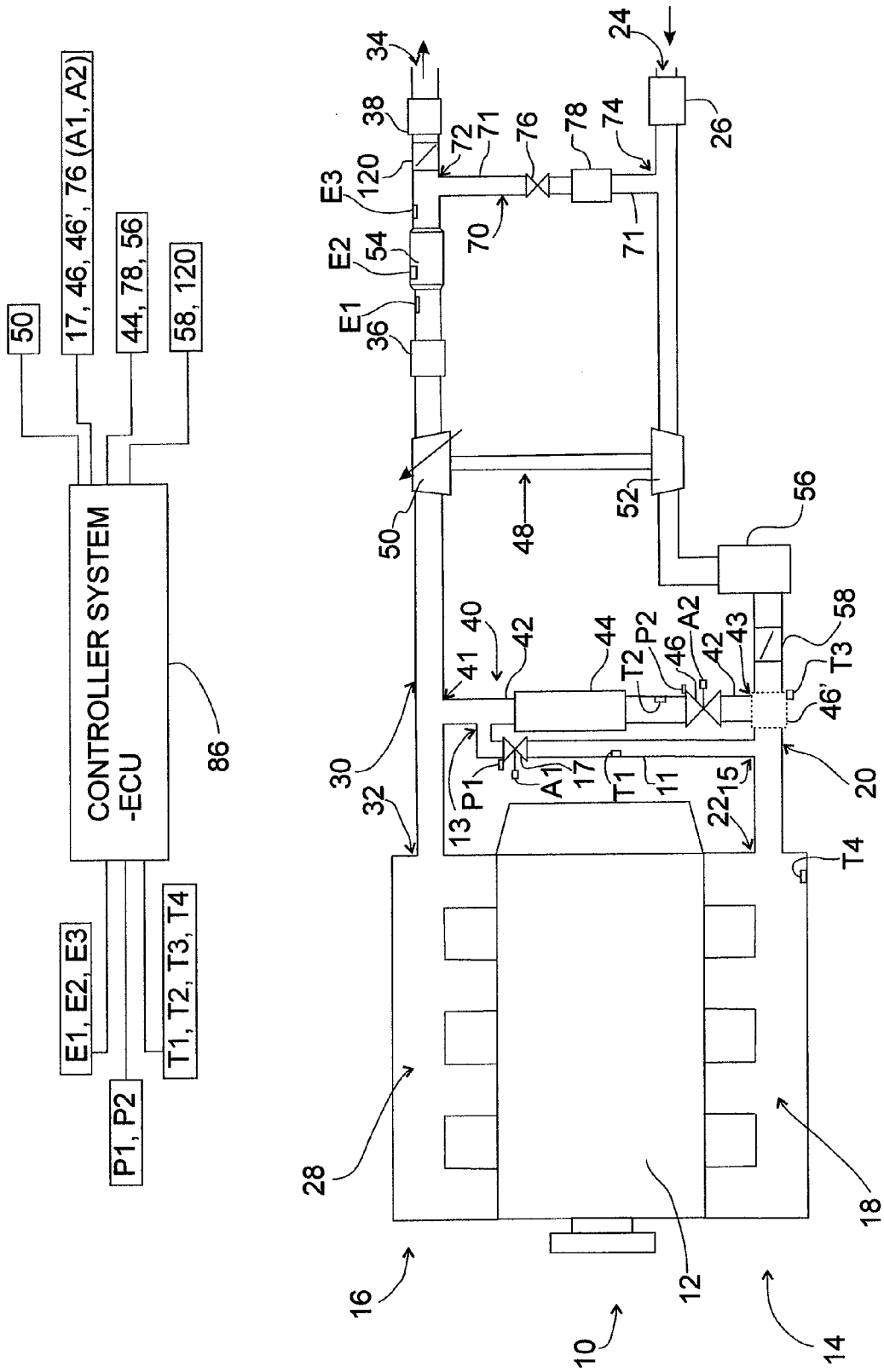
FIG. 2 illustrates another embodiment of the invention.

Referring now to FIG. 2, in another embodiment of the invention, the bypass line 11 may include a first end 13 connected to the primary EGR line 42 at a position upstream of the cooler 44 and a second end 15 may be connected directly to the primary air intake line 20 at a position downstream of the connection of the primary EGR line 42 to the primary air intake line 20. As shown in FIG. 2, a temperature sensor T1 may be positioned in the bypass line 11. The first control valve 17 may be positioned in the bypass line 11.

Figure 3:
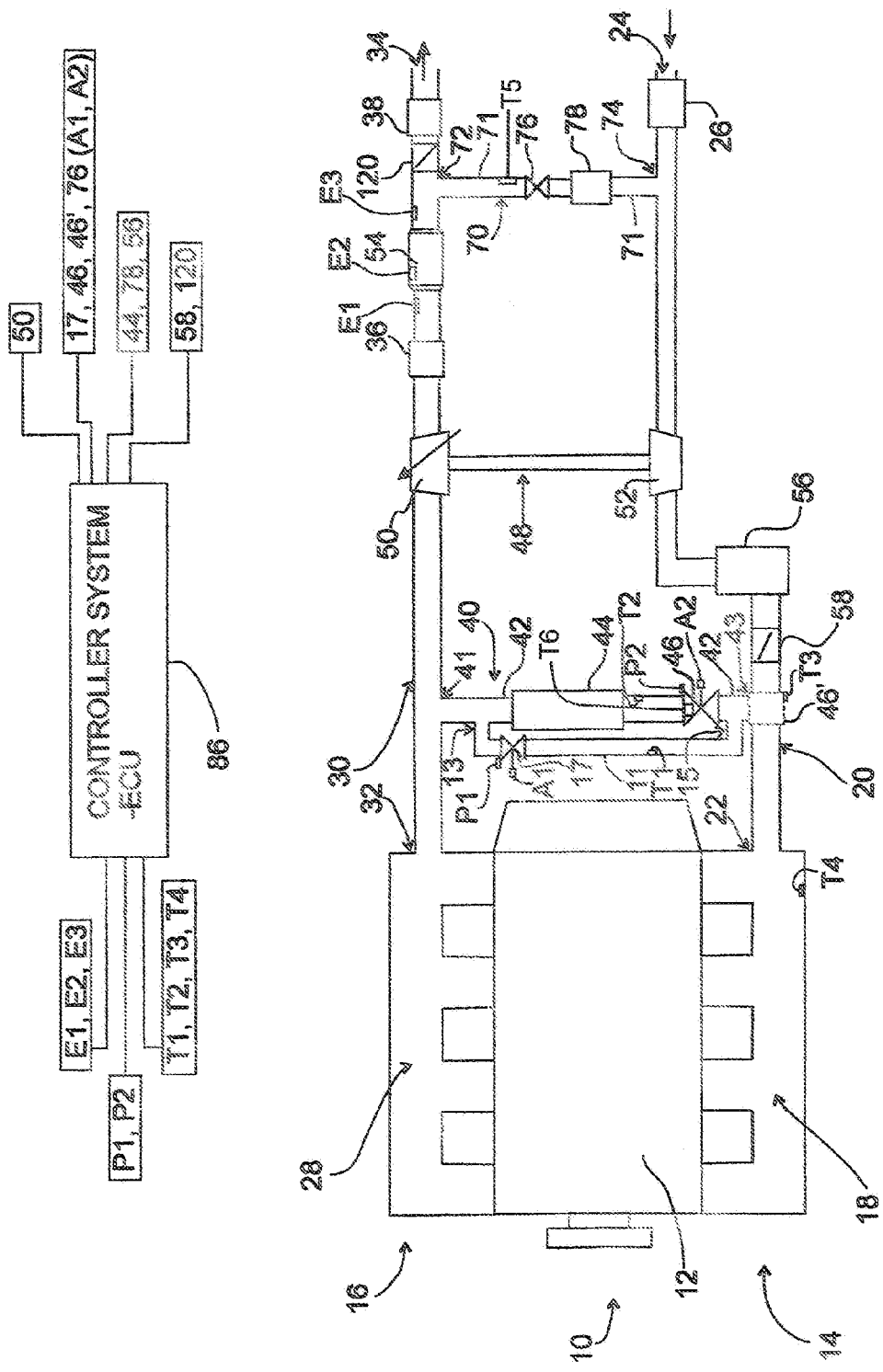
FIG. 3 illustrates another embodiment of the invention.

Referring now to FIG. 3, in another embodiment of the invention, the bypass line 11 may include a first end 13 connected to the primary EGR line 42 at a location upstream of the cooler 44 and may include a second end 15 connected to the primary EGR line 42 at a position downstream of the EGR valve 46. The first control valve 17 may be located in the bypass line 11. As shown in FIG. 3, in one embodiment, a temperature sensor T6 may be incorporated into the EGR valve 46.

Figure 4:
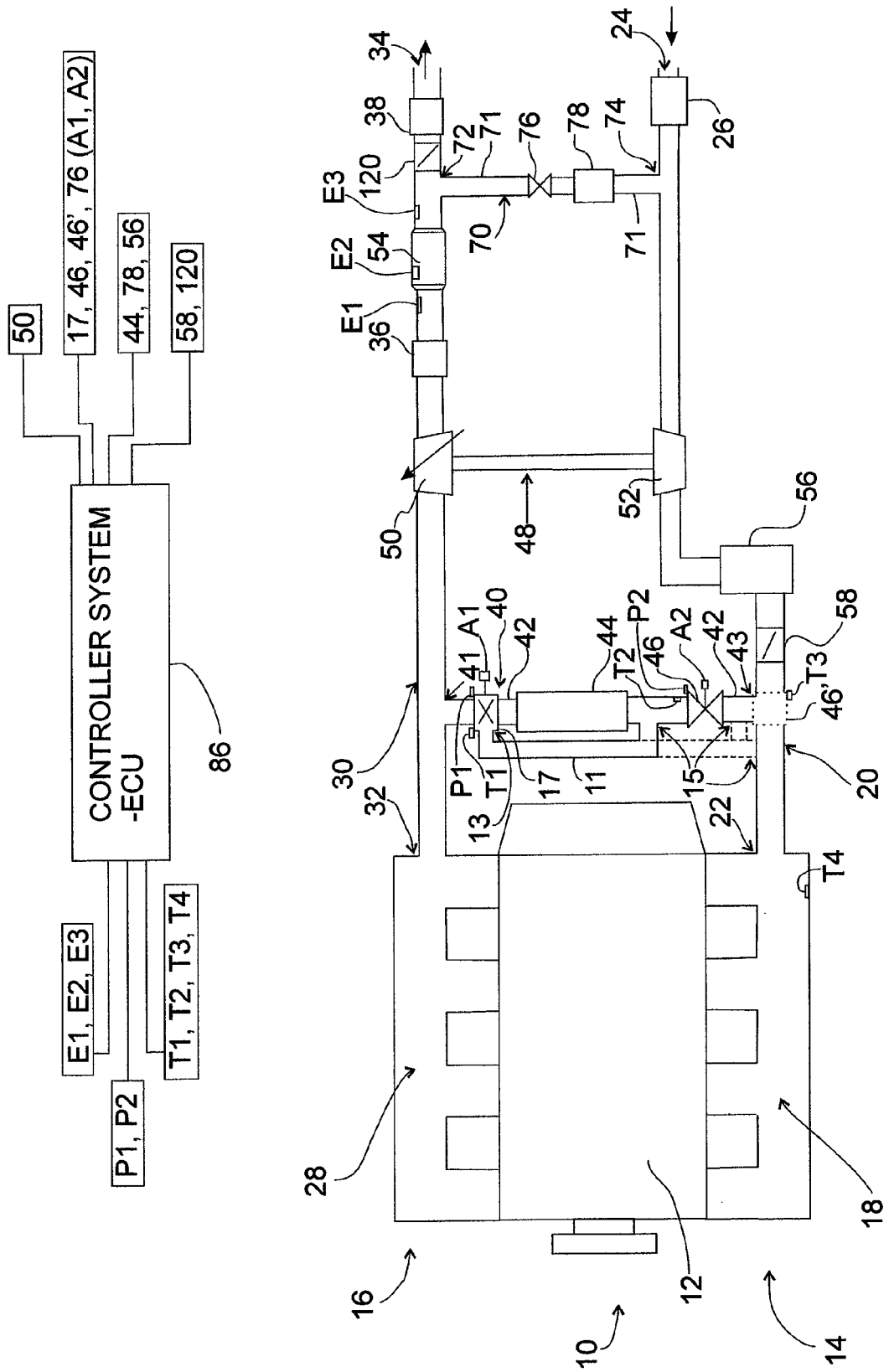
FIG. 4 illustrates another embodiment of the invention.

Referring now to FIG. 4, in another embodiment of the invention, the bypass line 11 may include a first end 13 connected to the primary EGR line 42 and a three-way valve 17 may be provided at the juncture of the first end 13 and the primary EGR line 42. A second end 15 of the bypass line 11 may be connected to the primary EGR line 42 at a position downstream of the cooler 44 and upstream of the EGR valve 46. Alternatively the second end 15 may be connected to the primary EGR line 42 at a position downstream of the EGR valve 46 prior to the connection of the primary EGR line 42 to the air intake line 20. In yet another embodiment, the second end 15 may be connected directly to the primary air intake line 20 at a location downstream of the connection of the primary EGR line 42 to the primary air intake line 20.

Figure 5:
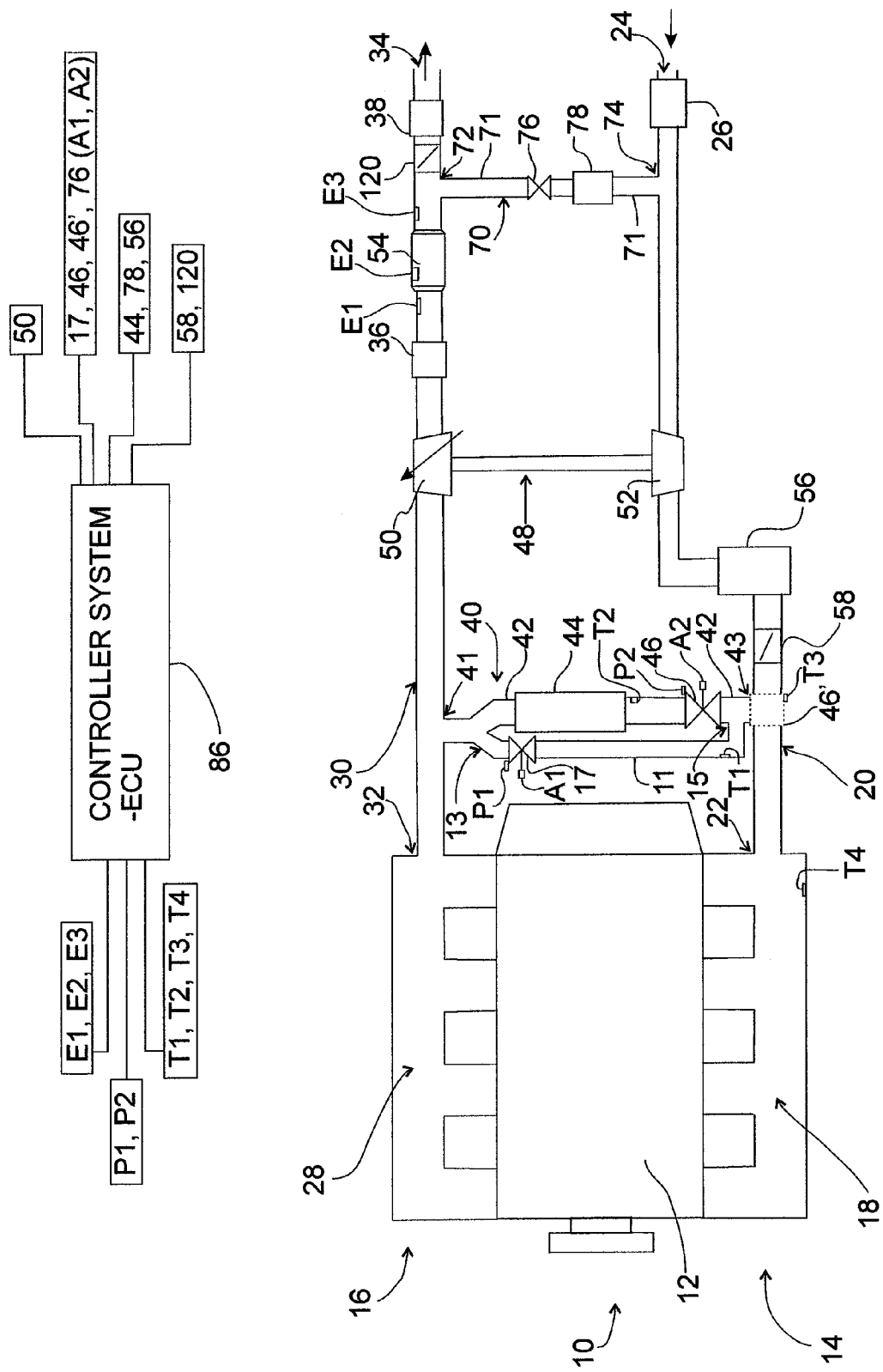
FIG. 5 illustrates another embodiment of the invention.

Referring now to FIG. 5, in another embodiment of the invention, a portion of the primary EGR line 42 and the bypass line 11 form a Y-shaped conduit structure and a first control valve 17 may be provided in the bypass line 11. The second end 15 of the bypass line 11 is connected to the primary EGR line 42 at a position downstream of the EGR valve 46.

As will be appreciated from FIGS. 1-7, the EGR valve 46 may also include a position sensor P2 operatively connected to the controller system 86 and may be used to provide feedback control of the actuator A2 used to move the EGR valve 46. Similarly, the alternative three-way EGR valve 46' may include an actuator and a position sensor in a similar manner. The controller system 86 may use the signal from the temperature sensors T1, T2, T3 and/or T4 to directly or indirectly determine the temperature of the exhaust gas and the combined temperature of the air intake and exhaust gas temperature. Other sensors may also be utilized that either measure temperature or imply temperature such as $NO_X$ sensors or pressure sensors used in combination with particulate filters. These sensors may determine the level of $NO_X$ or particulate matter that will imply the exhaust temperature or vice versa. This information can be used to determine how to position the first control valve 17 to achieve a desired temperature for control of emissions and suitable engine operation.

Referring again to FIGS. 1 and 4, the controller system 86 may provide an actuator control signal to control actuator A1 and the first control valve 17 to position the valve 17 to deliver portions of exhaust gas to the EGR cooler 44 and the EGR valve 46, 46'. The controller system 86 controls and monitors the position of the first control valve 17 using feedback from the position sensor P1. The exhaust gas and incoming air will flow to the air intake manifold 18 and into the cylinders of the engine. The controller system 86 may also provide a control signal to the actuator A2 to control the EGR valve 46, (or alternatively 46') to control the position of the valve to deliver a portion of the exhaust gas to the air intake manifold 18. The controller system 86 may receive a feedback signal from the temperature sensor T3 or T4 that indicates the temperature of the exhaust gas combined with incoming air. The controller system 86 can infer the exhaust gas temperature from the measured temperatures and the relative flows of the exhaust gas and incoming air.

The controller system 86 may use the signal from the temperature sensors T2, T3 or T4 to compare the exhaust gas temperature to a desired temperature for the current engine operating conditions. If the signal from the temperature sensors T2, T3 or T4 is within acceptable limits of a desired signal, the controller system 86 will not make any changes to the position of the first control valve 17. The controller system 86 may have other functions, for example, controlling and/or monitoring other components including, but not limited to, coolers 44, 78, 56.

If the signal from the temperature sensors T2, T3 or T4 indicates that the exhaust gas temperature entering the engine is below a desired temperature, the controller system will adjust the actuators control signal to the first control valve 17 to increase the portion of exhaust gas going directly to the EGR valve 46 and reduce the portion of the exhaust gas flowing through cooler 44. The combination of increased portion of higher temperature exhaust gas going directly to the EGR valve 46 or the air intake conduit 20 by way of the bypass conduit 11, and the decreased portion of the lower temperature exhaust gas going through the cooler 44 will result in an overall increase in exhaust gas temperature going into the air intake manifold 18. The temperature sensors T2, T3 or T4 will sense the increase in temperature and when the sensed temperature of the exhaust gas is within acceptable range of a desired temperature, the controller system 86 will maintain the position of the first control valve 17 using the actuator control signal and feedback from the position sensor P1.

If the signal from the temperature sensors T2, T3 or T4 indicates that the exhaust gas temperature entering the engine is above a desired temperature, the controller system 86 will adjust the actuator control signal to the first control valve 17 to increase the portion of exhaust gas going to the EGR cooler 44 and decrease the portion of the exhaust gas flowing through the bypass conduit 11 and directly to the EGR valve 46 or the air intake conduit 20. A combination of the decreased portion of higher temperature exhaust gas going directly to the EGR valve 46 or air intake conduit 20 and the increased portion of the lower temperature exhaust gas going through the cooler 44 will result in an overall decrease in the exhaust gas going through the EGR valve 46 and into the air intake manifold 18. The temperature sensors T2, T3 or T4 will sense the decrease in temperature. When the sensed temperature of the exhaust gas is within an acceptable range of a desired temperature, the controller system 86 will maintain the new position of the temperature control valve 17 using an actuator control signal and feedback from the valve 17 to position sensor P1.

Controlling the exhaust gas temperature being re-circulated to the air intake manifold 18 will assist in controlling the emissions of NO$_X$ and particulate matter. Generally, the formation of NO will occur at higher engine combustion temperatures and particulate matter will form at lower combustion temperatures.

As it will be appreciated, the above-described method may be used to control the combined temperature of the exhaust gas and the incoming air that will flow into the air intake manifold 18. This is achieved by the controller system 86 monitoring the temperature sensors T3 or T4 located in the flow path of the air intake manifold 18 and using this input to determine the position of the first control valve 17 to achieve a desired temperature of the exhaust gas and airflow into the air intake manifold 18. The control of the combined temperature of the exhaust gas and the air intake may also be accomplished by monitoring the temperature of exhaust gas or air in one or more of the exhaust manifold 28, primary exhaust conduit 30, primarily air intake conduit 20, primary EGR line 42, bypass line 11 and second EGR line 71.

Referring now to FIGS. 2, 3 and 5, the valve 17 is provided in the bypass line 11 and the second end 15 of the bypass line 11 is connected to the primary EGR line 42 downstream of the EGR valve 46 or the bypass line is connected to the air intake line 20 at a location downstream of the connection of the primary EGR line 42 to the air intake line 20. The EGR valve 46 is utilized to control the amount of exhaust gas flowing through the cooler 44 and the valve 17 is utilized to control the amount of exhaust gas bypassing the cooler 44 and flowing directly into the air intake manifold 18. The gas flowing directly through the bypass valve 17 and the bypass line 11 will have a higher temperature than the exhaust flowing through the EGR cooler 44. The temperature of the exhaust gas flowing into the air intake manifold 18 will be a function of the temperatures and the mass flow rates of the first portion flowing through the cooler 44 and the second portion flowing through the bypass line 11. The valve 17 and the EGR valve 46 are individually controlled. The controller system 86 may receive input from temperature sensors T1, T2, T3 and/or T4 and valves 17, 46 or 46' are controlled in response to the inputs. The controller system 86 may use the temperature sensor feedback and a desired temperature, to determine the actuator control signal for EGR valve 46, 46' and valve 17. The position sensors P1 and P2 of valves 17 and 46 respectfully may be used to provide feedback to the controller system 86 that will indicate if the valves have achieved the desired position and associated flows. The controller system 86 may adjust the control signal to achieve-or-maintain the desired positions of the valves 17, 46, 46'. The position sensor feedback for each valve may be used to provide the desired first portion and second portion of exhaust gas flowing through primary EGR line 42 and bypass line 11.

An alternative embodiment of the invention includes a method of controlling the exhaust gas temperature wherein the T2 sensor is integrated into EGR valve 46 or temperature sensor T3 is integrated into the three-way EGR valve 46'. The controller system 86 may be used to monitor the temperature sensor T2 or T3 and may use the temperature sensor input to determine the position of the first control valve 17 to achieve a desired temperature of exhaust gas flowing through the EGR valve 46, 46'.

Another embodiment of the invention includes a method for controlling exhaust gas temperature and vehicle emissions using other inputs, or a combination of inputs, such as, but not limited to, emission sensors E1, E2, or E3 which may include NO$_X$ sensors, oxygen sensors, or a sensor used to determine the level of particulate matter. The controller system 86 may monitor the inputs from sensors E1, E2 and/or E3 to determine the level and type of vehicle emission and determine the desired exhaust gas temperature required to control them. The controller system 86 may provide an actuator control signal to control the first valve 17 to achieve the desired temperature and lower the desired emission level of an emission constituent or balance the relative emission level of two or more emission constituents. For example, the system may be utilized to balance the amount of NO$_X$ emissions in comparison to the amount of particulate matter emissions and vice versa. The controller system 86 may be utilized to monitor the inputs from sensors E1, E2 and/or E3, or one or more of E1, E2 or E3 in combination with one or more of T1, T2, T3 or T4. When the emissions are determined to be within an acceptable range or the emissions, or two or more constituents are within an acceptable range with respect to each other, the controller system 86 maintains the position of the temperature control valve 17 using an actuator control signal and may use feedback from the valve 17 position sensor P1. Valve 17, 46, 46' may be adjusted to balance the emission level of NO$_X$ relative to particulate matter under various engine operating conditions.

Figure 6:
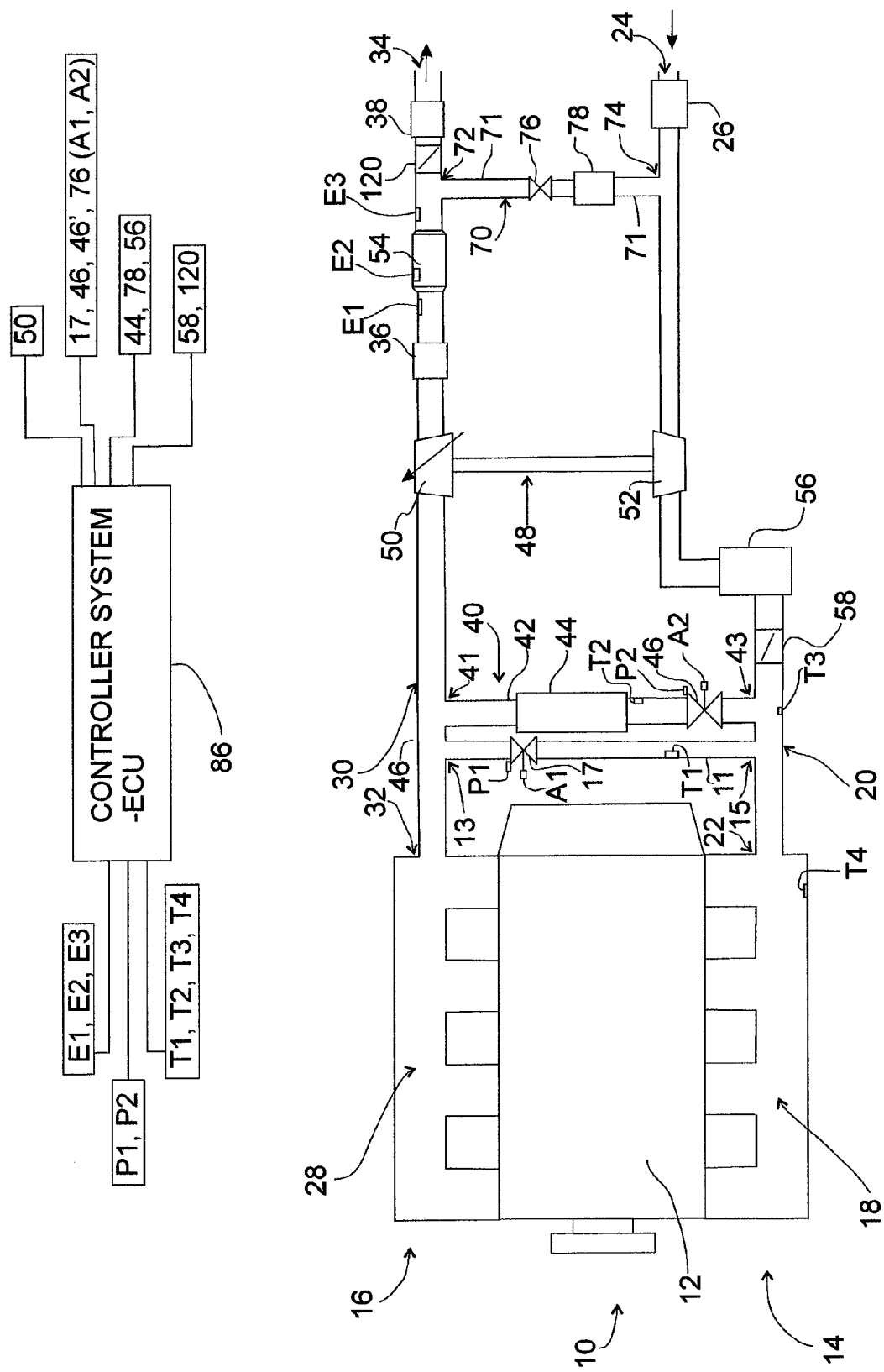
FIG. 6 illustrates another embodiment of the invention.

One embodiment of the invention includes a combustion engine breathing system having a cooled exhaust gas recirculation line extending from the exhaust side to the air intake side and an uncooled exhaust gas recirculation line extending from the exhaust side to the air intake side. For example, as illustrated in FIG. 6, one embodiment of the invention may include a first exhaust gas recirculation line 42 having a cooler 44 in communication therewith extending from the primary exhaust gas conduit 30 to the primary air intake conduit 20 and including an exhaust gas recirculation valve 46 therein to control the gas flowing therethrough. A separate bypass line 11 may be provided extending from the primary exhaust gas conduit 30 to the air intake conduit 20. The bypass EGR line 11 may include a first control valve 17 therein to control the flow of exhaust gas therethrough. The location of the first EGR line 42 and the bypass line 11 may vary as desired, with one being either upstream or downstream of the other.

Figure 7:
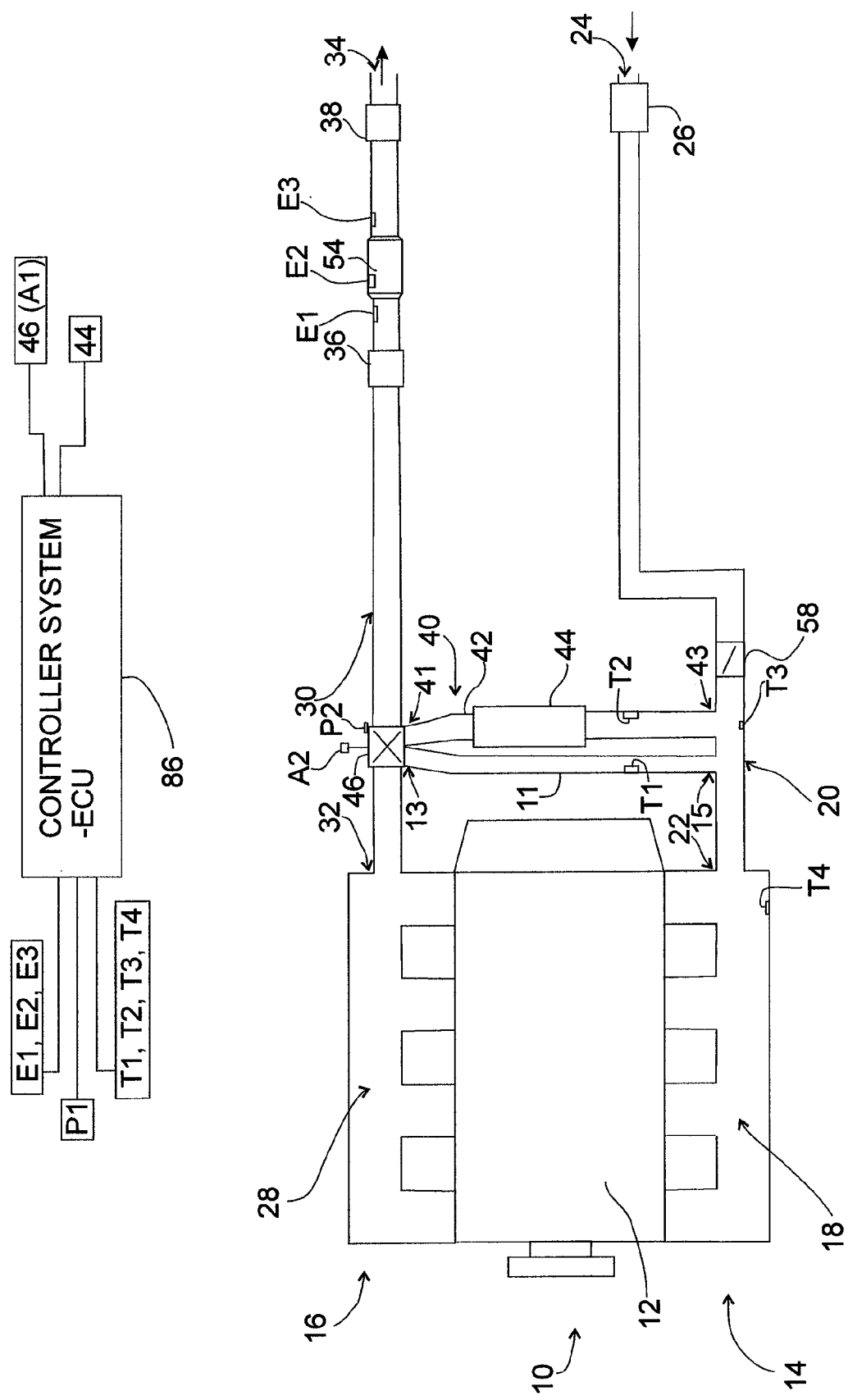
FIG. 7 illustrates another embodiment of the invention.

FIG. 7 illustrates another embodiment of the invention wherein a primary EGR line 42 is provided extending from the primary exhaust gas conduit 30 to the primary air conduit 20 and may include a cooler in fluid communication therewith to cool exhaust gas flowing therethrough. A separate bypass line 11 may be provided extending from the primary exhaust gas conduit 30 to the primary air intake conduit 20. Control of gas flowing through the first EGR line 42 and the bypass EGR line 11 may be accomplished by a four-way valve 46 located at the juncture of the primary exhaust conduit 30, the first EGR line 42 and the bypass line 11. Any four-way valve known to those skilled in the art may be utilized. Assignee's copending application, U.S. Ser. No. 11/527,089 discloses a multi-port valve that may be modified to include four ports including an inlet port to receive exhaust from the exhaust gas manifold 28, a first outlet port to exhaust gas through the open end 34 of the primary exhaust gas conduit 30, a second outlet port to exhaust gas through the first EGR line 42 and a third outlet port to exhaust gas through the bypass line 11.

Another embodiment of the invention includes a method of controlling a combustion air breathing system including an exhaust side having a primary exhaust gas conduit 30, and an air intake side 14 including a primary air intake conduit 20, a first EGR line 42 extending from the primary exhaust gas conduit 30 to the primary air intake conduit 20 and having a cooler 44 therein to cool the exhaust gas flowing therethrough. A bypass line may be provided, constructed and arranged, to flow exhaust gas around the cooler in the first EGR line. A plurality of sensors may be provided to provide input to a controller system including a signal or data representative or indicative of the emissions of a first and second constituent. The controller system compares the sensed level of emissions for each of the first and second constituents and compares each to a predetermined acceptable range. If one of the constituents is outside or approaching an outer limit of a predetermined acceptable range, and the other constituent is within the predetermined acceptable range for that constituent, the controller selectively activates one or more of the valves 17, 46 or 46' to adjust the proportion of gas flowing through the primary EGR line 42 and through the cooler 44 and the amount of exhaust gas flowing through the bypass line 11 to cause the amount of emissions of the first and second constituents to come within the predetermined acceptable range for each. For example, if input from sensors E1, E3, T1, T2, T3 or T4 indicate that the $NO_X$ emissions is outside a predetermined acceptable range or near the outer limit of a predetermined acceptable range, valve 17 may be actuated to reduce or stop the amount of exhaust gas flowing through the bypass line 11 and cause more EGR gas to flow through the cooler 44 to reduce the temperature of the mixture of exhaust gas and charge air entering the combustion engine to thereby reduce the amount of $NO_X$ being produced by the combustion engine. Similarly, if inputs from sensors E1, E2, E3, T1, T2, T3 or T4 indicate that the amount of particulates is outside of or near the outer limit of a predetermined acceptable range, the controller system 86 may cause valve 46, 46' to reduce or stop the amount of exhaust gas flowing through the primary EGR line 42 and through the cooler and open valve 17 to cause more exhaust gas to flow through the bypass line 11 to thereby increase the temperature of the exhaust gas and charge air mixture entering the combustion engine to reduce the amount of particulates being produced by the combustion engine.

Another embodiment of the invention includes a method comprising obtaining information representative of emission constituents including the amount of $NO_x$ and the amount of particulate matter being produced by a combustion engine; and comparing the amount of $NO_x$ being produced to a first predetermined acceptable range and comparing the amount of particulate matter being produced to a second predetermined acceptable range, and if one of the amount of $NO_x$ and the amount of particulate matter are outside of or near the outer limit of the respective first or second predetermined acceptable range. Estimating whether the amount of exhaust gas flowing through a first EGR line with a cooler in fluid communication therewith or the amount of exhaust gas flowing through a bypass line around the cooler may be adjusted to reduce the amount of the emission constituent that is outside of or near the outer limit of the predetermined acceptable range without causing the other emission constituent to be outside of a second predetermined acceptable range. This may be accomplished using look-up tables or performing estimate calculations based on data related to the engine, valves, temperatures (T1-T4), emission (E1-E3) under various engine and breathing system operating conditions. If appropriate, the flow rate of exhaust through the first EGR line with the cooler in fluid communication therewith and the amount of flow rate through the bypass line around the cooler may be altered.

Another embodiment of the invention includes a method comprising obtaining information representative of the amount of $NO_x$ and the amount of particulate matter being produced by a combustion engine; comparing the obtained information to a first predetermined acceptable range for the amount of $NO_x$ and to a second predetermined acceptable range for the amount of particulate matter and if the amount of particulate matter being produced can be increased and still stay within the second predetermined acceptable range, then decreasing the amount of $NO_x$ being produced by increasing the amount of exhaust gas flowing through a first primary exhaust gas line having a cooler therein for reducing the temperature of the exhaust gas flowing therethrough, and decreasing the amount of gas flowing through a bypass line around the cooler.

The above description of embodiments of the invention is merely exemplary in nature and, thus, variations thereof are not to be regarded as a departure from the spirit and scope of the invention.

What is claimed is:

1. A method comprising:
providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler;

obtaining information representative of the amount of NOX and the amount of particulate matter being produced by the combustion engine;

adjusting the amount of NOX and the amount of particulate matter being produced by the combustion engine comprising controlling the amount of combustion engine exhaust gas re-circulated through the exhaust recirculation gas cooler and through an exhaust recirculation gas cooler bypass using the information; and wherein the system further comprises a controller system and wherein the obtaining information comprises the controller system receiving information from a temperature sensor in the primary exhaust gas recirculation line.

2. The method as set forth in claim 1 wherein the adjusting the amount of NOX and the amount of particulate matter being produced by the combustion engine further comprises balancing the amount of NOX and the amount of particulate matter being produced relative to each other.

3. The method as set forth in claim 1 wherein the adjusting the amount of NOX and the amount of particulate matter causes the amount of NOX being produced to be within a first predetermined acceptable range and the amount of particulate matter being produced within a second predetermined acceptable range.

4. The method as set forth in claim 1 wherein the bypass line includes a first end connected to the primary exhaust gas recirculation line upstream of the cooler and a second end connected to the primary exhaust gas recirculation line downstream of the cooler.

5. The method as set forth in claim 1 wherein the system further comprises an exhaust recirculation valve in the exhaust recirculation line downstream of the cooler and wherein the bypass line has an end connected to the exhaust recirculation line downstream of the cooler and upstream or downstream of the exhaust recirculation valve.

6. The method as set forth in claim 1 wherein the air intake side comprises an air intake conduit and wherein the bypass line has a first end connected to the air intake conduit.

7. The method as set forth in claim 1 wherein the combustion exhaust side comprises a primary exhaust conduit and wherein the bypass line has an end connected to the primary exhaust conduit.

8. The method as set forth in claim 1 wherein the combustion exhaust side comprises a primary exhaust conduit and the system further includes a four-way valve comprising an inlet connected to a primary exhaust conduit, a first outlet connected to the primary exhaust conduit, a second outlet connected to the primary exhaust gas recirculation line, and a third outlet connected to the bypass line.

9. A method comprising:
providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler;

obtaining information representative of the amount of NOX and the amount of particulate matter being produced by the combustion engine;

adjusting the amount of NOX and the amount of particulate matter being produced by the combustion engine comprising controlling the amount of combustion engine exhaust gas re-circulated through the exhaust recirculation gas cooler and through an exhaust recirculation gas cooler bypass using the information; and wherein the system further comprises a controller system and wherein the obtaining information comprises the controller system receiving information from a temperature sensor in the bypass line.

10. The method as set forth in claim 9 wherein the adjusting the amount of NOX and the amount of particulate matter being produced by the combustion engine further comprises balancing the amount of NOX and the amount of particulate matter being produced relative to each other.

11. The method as set forth in claim 9 wherein the adjusting the amount of NOX and the amount of particulate matter causes the amount of NOX being produced to be within a first predetermined acceptable range and the amount of particulate matter being produced within a second predetermined acceptable range.

12. The method as set forth in claim 9 wherein the bypass line includes a first end connected to the primary exhaust gas recirculation line upstream of the cooler and a second end connected to the primary exhaust gas recirculation line downstream of the cooler.

13. The method as set forth in claim 9 wherein the system further comprises an exhaust recirculation valve in the exhaust recirculation line downstream of the cooler and wherein the bypass line has an end connected to the exhaust recirculation line downstream of the cooler and upstream or downstream of the exhaust recirculation valve.

14. The method as set forth in claim 9 wherein the air intake side comprises an air intake conduit and wherein the bypass line has a first end connected to the air intake conduit.

15. The method as set forth in claim 9 wherein the combustion exhaust side comprises a primary exhaust conduit and wherein the bypass line has an end connected to the primary exhaust conduit.

16. The method as set forth in claim 9 wherein the combustion exhaust side comprises a primary exhaust conduit and the system further includes a four-way valve comprising an inlet connected to a primary exhaust conduit, a first outlet connected to the primary exhaust conduit, a second outlet connected to the primary exhaust gas recirculation line, and a third outlet connected to the bypass line.

17. A method comprising:
providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so that the gas flowing through the bypass line is substantially not cooled by the cooler;

obtaining information representative of the amount of NOX and the amount of particulate matter being produced by the combustion engine; and making a first determination as to whether the amount of NOX being produced by the combustion engine is outside of or approaching an outer limit of a first predetermined acceptable range and making a second determination as to whether the amount of particulate matter being produced by the combustion engine is outside of or approaching an outer limit of a second predetermined acceptable range;

adjusting the amount of NOX and the amount of particulate matter being produced by the combustion engine in response to the first determination and the second determination comprising controlling the amount of combustion engine exhaust gas re-circulated through the exhaust recirculation gas cooler and through the exhaust recirculation gas cooler bypass.

18. A method comprising:

providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler;

obtaining information representative of the amount of NOX and the amount of particulate matter being produced by the combustion engine;

adjusting the amount of NOX and the amount of particulate matter being produced by the combustion engine comprising controlling the amount of combustion engine exhaust gas re-circulated through the exhaust recirculation gas cooler and through an exhaust recirculation gas cooler bypass using the information; and wherein the system further comprises a controller system and wherein the obtaining information comprises the controller system receiving information from a temperature sensor in a valve in the exhaust gas recirculation line or the bypass line.

19. A method comprising:

providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler;

obtaining information representative of the amount of NOX and the amount of particulate matter being produced by the combustion engine;

adjusting the amount of NOX and the amount of particulate matter being produced by the combustion engine comprising controlling the amount of combustion engine exhaust gas re-circulated through the exhaust recirculation gas cooler and through an exhaust recirculation gas cooler bypass using the information; and wherein the combustion exhaust side comprises a primary exhaust conduit and the system further includes a four-way valve comprising an inlet connected to a primary exhaust conduit, a first outlet connected to the primary exhaust conduit, a second outlet connected to the primary exhaust gas recirculation line, and a third outlet connected to the bypass line.

20. A method comprising:

providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler, and a second exhaust gas recirculation assembly extending from the air intake side to the combustion exhaust side, the second gas recirculation assembly comprising a secondary exhaust gas recirculation line;

obtaining information representative of the amount of NOX and the amount of particulate matter being produced by the combustion engine;

adjusting the amount of NOX and the amount of particulate matter being produced by the combustion engine comprising controlling the amount of combustion engine exhaust gas re-circulated through the exhaust recirculation gas cooler and through an exhaust recirculation gas cooler bypass using the information; and wherein the system further comprises a controller system and wherein the obtaining information comprises the controller system receiving information from a temperature sensor in the secondary exhaust gas recirculation line.

21. A method comprising:

providing a system including a combustion engine, a combustion engine breather system comprising an air intake side constructed and arranged to deliver combustion air to the engine, a combustion exhaust side constructed and arranged to capture combustion exhaust from the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so that the gas flowing through the bypass line is substantially not cooled by the cooler;

obtaining information representative of the amount of NOX and the amount of particulate matter being produced by the combustion engine; and making a first determination as to whether the amount of NOX being produced by the combustion engine is outside of or approaching an outer limit of a first predetermined acceptable range and making a second determination as to whether the amount of particulate matter being produced by the combustion engine is outside of or approaching an outer limit of a second predetermined acceptable range;

if the amount of NOX being produced by the combustion engine is outside of or approaching the outer limit of the first predetermined acceptable range, making a first estimate of change that can be made to the amount of particulate matter being produced by the engine and still stay within the second predetermined acceptable range;

adjusting the amount of NOX and the amount of particulate matter being produced by the combustion engine in response to the first determination, the second determination and the first estimate comprising controlling the amount of combustion engine exhaust gas re-circulated through the exhaust recirculation gas cooler and through the exhaust recirculation gas cooler bypass.

22. A method comprising:

providing a system including a combustion engine, a combustion engine breather system comprising an air intake side constructed and arranged to deliver combustion air to the engine, a combustion exhaust side constructed and arranged to capture combustion exhaust from fro the engine, a first exhaust gas recirculation assembly extending from the air intake side to the combustion exhaust side, the first exhaust gas recirculation assembly comprising a primary exhaust gas recirculation line and a cooler in fluid communication therewith constructed and arranged to cool fluid flowing through the cooler, and a bypass line constructed and arranged to flow exhaust gas around the cooler and so the gas flowing through the bypass line is not substantially cooled by the cooler;

obtaining information representative of the amount of NOX and the amount of particulate matter being produced by the combustion engine; and making a first determination as to whether the amount of NOX being produced by the combustion engine is outside of or approaching an outer limit of a first predetermined acceptable range and making a second determination as to whether the amount of particulate matter being produced by the combustion engine is outside of or approaching an outer limit of a second predetermined acceptable range;

if the amount of particulate matter being produced by the combustion engine is outside of or approaching the outer limit of the second predetermined acceptable range, making a first estimate of change that can be made to the amount of amount of NOX being produced by the engine and still stay within the first predetermined acceptable range;

adjusting the amount of NOX and the amount of particulate matter being produced by the combustion engine in response to the first determination, the second determination and the first estimate comprising controlling the amount of combustion engine exhaust gas re-circulated through the exhaust recirculation gas cooler and through the exhaust recirculation gas cooler bypass.

* * * * *